US007325253B2

(12) United States Patent
Colleran et al.

(10) Patent No.: US 7,325,253 B2
(45) Date of Patent: Jan. 29, 2008

(54) SYSTEM AND METHOD FOR ELECTRONIC CONSENT AND DELIVERY OF FINANCIAL AND/OR OTHER TRANSACTION-RELATED INFORMATION

(75) Inventors: Kevin Colleran, Hoboken, NJ (US);
John Hester, Bayonne, NJ (US)

(73) Assignee: i-Deal LLC, New York, NY (US)

( * ) Notice: Subject to any disclaimer, the term of this patent is extended or adjusted under 35 U.S.C. 154(b) by 567 days.

(21) Appl. No.: 10/714,934

(22) Filed: Nov. 18, 2003

(65) Prior Publication Data

US 2005/0108124 A1    May 19, 2005

(51) Int. Cl.
*G06F 7/04* (2006.01)
(52) U.S. Cl. .............................. 726/27; 705/1; 705/35; 713/200; 713/201
(58) Field of Classification Search ................. 709/206; 705/36; 726/27
See application file for complete search history.

(56) References Cited

U.S. PATENT DOCUMENTS 6,574,598 B1 *   6/2003  Nakatsuyama et al. ..... 704/260
6,782,506 B1 *   8/2004  Burakoff et al. ............ 715/516
7,028,190 B2 *   4/2006  Burakoff et al. ............ 713/182

OTHER PUBLICATIONS

International Search Report and Written Opinion for Application No. PCT/US04/34349, dated Nov. 2, 2006 (mailing date).

* cited by examiner

*Primary Examiner*—Jagdish N Patel
(74) *Attorney, Agent, or Firm*—King & Spalding LLP

(57) ABSTRACT

The present invention relates to a method and system for effectively and efficiently delivering financial and/or other transaction-related information to investors while complying with relevant governmental rules and regulations regarding notice, access and proof of delivery. The method and system of the present invention enable individual consent of electronic delivery of financial and/or other transaction-related information from investors and electronically delivering such information and/or documentation to the consented recipients. The system can manage and update investor lists for issuers and/or market intermediaries; prepare financial and other transaction-related information for review; replace or supplement hardcopy documents by disseminating such financial and other transaction-related information through an electronic delivery fulfillment system that complies with governmental rules and regulations; and enable real-time audit tracking of the electronic delivery to confirm both delivery and access of delivered information and to track corrupted electronic deliveries.

24 Claims, 12 Drawing Sheets

SYSTEM AND METHOD FOR ELECTRONIC CONSENT AND DELIVERY OF FINANCIAL AND/OR OTHER TRANSACTION-RELATED INFORMATION

BACKGROUND OF THE INVENTION

1. Field of the Invention

The present invention relates to systems and methods for receiving consents to the electronic receipt of financial and/or other transaction-related information and electronically delivering such information. More specifically, the present invention relates to a method and system for enabling users to electronically consent to the electronic delivery of financial and/or other transaction-related documentation and electronically delivering such documentation to the consented users.

2. Background

In the United States, the offering and sale of new securities are primarily governed by the Securities Act of 1933, which requires the delivery of financial and other pertinent information and/or documentation concerning securities being offered for sale to the investors. Further, the Securities Exchange Commission (SEC) is tasked with enforcing the Securities Act of 1933 and other securities laws and regulations.

Traditionally, hard copies of financial information and/or documentation are delivered to investors via paper-based distribution methods such as postal mail. Such traditional methods suffer from a number of drawbacks. First, due to the fluidity of the securities market, there is a constant change of investors of a particular type of securities offering; hence, investor address labels are often outdated for mailing purposes. Second, the printing and shipping of hard copies of financial information and/or documentation added cost and time delay to the overall transaction. Third, when there are document errors, hard copies need to be corrected, reprinted, and reshipped with additional cost and time delay.

The advent of electronic data communication in general, and the Internet particularly, has spawned new electronic distribution methods for the dissemination of information that are faster and more efficient than the traditional paper-based distribution methods. To reconcile and interpret the Securities Act of 1933 in light of the advances in electronic media technology, the SEC issued interpretive releases in October 1995 and April 2000 to provide guidance to securities issuers and investors regarding the delivery of financial and other pertinent information concerning private securities by electronic means.

In the aforementioned interpretive releases, the SEC has analogized the electronic delivery of information to the traditional paper delivery procedures and stated that it "would view information distributed through electronic means as satisfying the delivery and transmission requirements of the federal securities laws if such distribution results in the delivery to the intended recipients of substantially equivalent information as these recipients would have had if the information were delivered to them in paper form." Hence, fundamentally, the SEC favors the electronic delivery of information to investors when such delivery is comparable to the traditional paper delivery in satisfying the delivery or transmission requirements stated in the Securities Act of 1933 and other federal securities laws.

According to the aforementioned interpretive releases, the issuers and/or market intermediaries (on behalf of the issuers) must comply with three aspects of electronic delivery requirement: notice, access, and evidence of delivery.

Regarding the notice aspect, the SEC has stated that the electronic communication should provide "timely and adequate notice to investors that information for them is available." To that extent, direct notice of the availability of pertinent financial information, such as providing a prospectus by e-mail, will satisfy notice. However, the mere posting of pertinent financial information, such as a prospectus or a final official document, on an Internet web site (analogous to a publication in the newspaper) is insufficient unless investors also receive a separate qualified notice.

Regarding the access aspect, the SEC has stated that investors who are provided information through electronic delivery should have access comparable to that provided by postal mail, wherein "a recipient should have the opportunity to retain the information or having ongoing access equivalent to personal retention." To that extent, a recipient should have the ability to download and retain a copy of the information in any medium, wherein the particular medium "should not be so burdensome that intended recipients cannot effectively access the information provided." For instance, a copy of the information can be made available and downloaded in portable document format (PDF) if the recipient is provided with the "necessary software and assistance at no cost." Likewise, if the information is posted online, the recipient should have access to such information "for as long as the delivery requirement applies."

Regarding the evidence-of-delivery aspect, the SEC has stated that issuers and others providing electronic delivery of information "should have reason to believe that any electronic means so selected will result in the satisfaction of the delivery requirements." For instance, this aspect can be satisfied if the issuer obtains "an informed consent from an investor to receive the information through a particular electronic medium." An informed consent can be: 1) a deal-specific consent, wherein the investor indicates consent to electronically receive particular document(s) or information from a particular issuer; or 2) a global consent, wherein the investor indicates consent to electronically receive any documents from any issuer. In another instance, the evidence-of-delivery aspect can be satisfied if the issuer or the marketing intermediary, on behalf of the issuer, obtains "evidence that an investor actually received the information, for example, by electronic mail return-receipt or confirmation of accessing, downloading, or printing." Such evidence can be obtained through proper record keeping, including notification when document is available to an investor, and date/time recordation of each delivery to such investor.

The Municipal Securities Rulemaking Board (MSRB), which makes rules regulating dealers who deal in municipal bonds, municipal notes, and other municipal securities, also has guidelines similar to those mentioned above for electronic delivery of financial and other pertinent information concerning municipal securities.

SUMMARY OF THE INVENTION

Accordingly, there exists an opportunity to take advantages of the aforementioned guidelines for electronic delivery of financial and/or other transaction-related information and provide market intermediaries and issuers with a system and method for effectively and efficiently delivering financial and other transaction-related information to desired recipients, such as investors, while complying with governing rules and regulations.

The preferred embodiments of the present invention seek the above opportunity by providing a system and method for issuers and/or market intermediaries to receive individual consent of electronic delivery of financial and other transaction-related information from recipients and electronically delivering such information and/or documentation to the consented recipients in a time-efficient and cost-saving manner for issuers and market intermediaries.

The preferred embodiments of the present invention also provide a system and method for: managing and updating investor lists for issuers and/or market intermediaries; preparing financial information for review; replacing or supplementing hardcopy documents by disseminating such financial and other transaction-related information through an electronic delivery fulfillment system that complies with governing rules and regulations; and enabling real-time audit tracking of the electronic delivery to confirm both delivery and access of delivered information and to track corrupted electronic deliveries.

The preferred embodiments of the present invention also provide a system and method for complying with governmental requirements of notice, access, and proof-of-delivery for the electronic delivery of pertinent financial and other transaction-related information by: notifying investors via e-mail with a secure link to information/document residing in a secure site, making available password protection for transactions, and real-time audit tracking of the delivery of the document to investors.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments of the present invention are illustrated by way of example and not limited to the following figures.

DETAILED DESCRIPTION OF THE INVENTION

Reference is now made in detail to embodiments of the present invention, an illustrative example of which is illustrated in the accompanying attachments, showing a method and system for electronically receiving a consent to electronic delivery of financial and other transaction-related information from a recipient and electronically delivering such information to the consented recipient.

Figure 1:
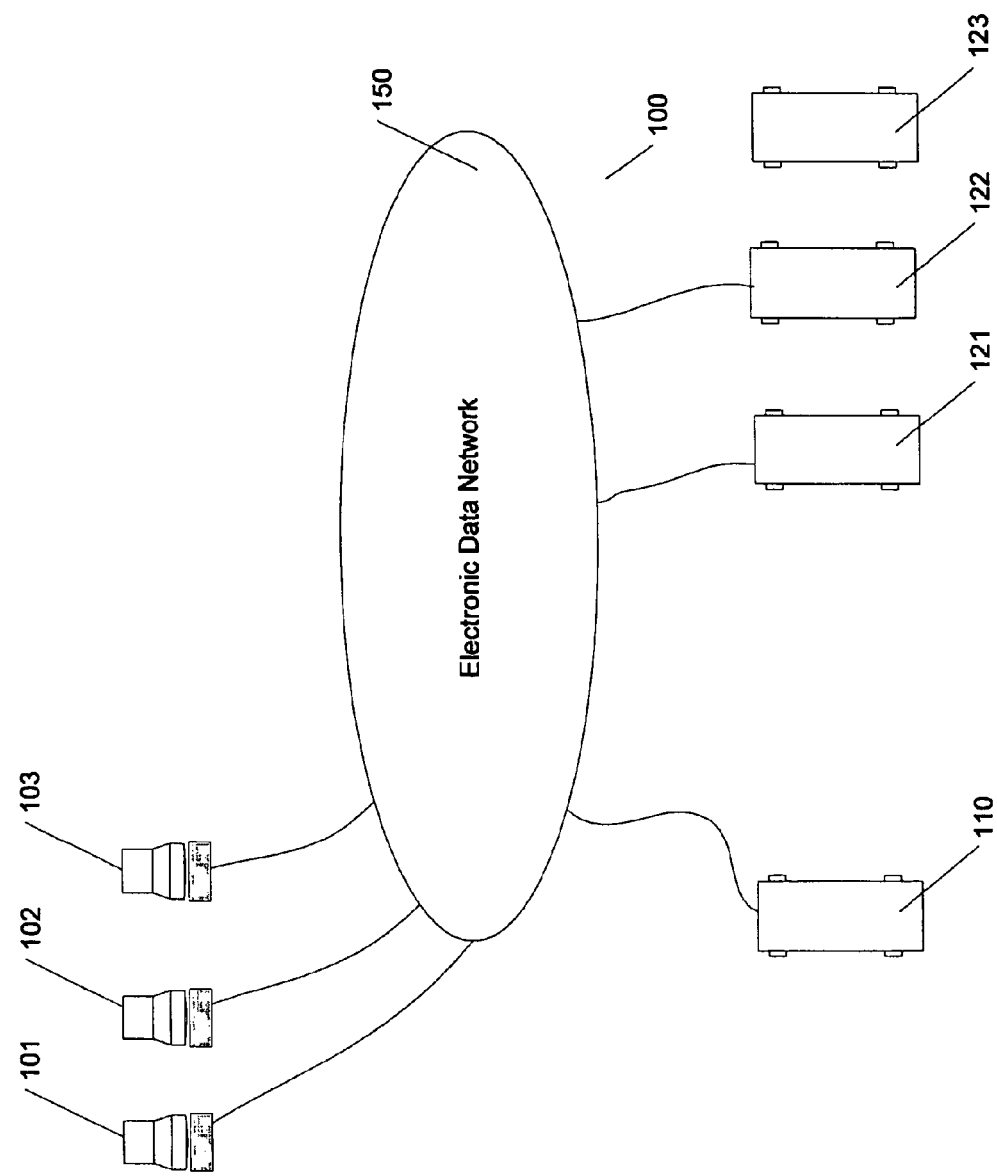
FIG. 1 depicts a system for electronic consent and delivery of financial and other transaction-related information in accordance with an embodiment of the present invention.

FIG. 1 provides a schematic illustration of a system in accordance with an embodiment of the present invention, designated generally by the reference numeral 100, that provides electronic consent and delivery of financial and other transaction-related information from issuers, or market intermediaries, 121-123 to recipients, such as investors 101-103, as facilitated by a service provider 110. The issuers 121-123, the investors 101-103, and the service provider 110 can each have a computer or server in communication with an electronic data network 150, which can be a private data network, such as a local area network (LAN) or wide area network (WAN), or a public data network, such as the Internet. An investor can be an individual, a group of individuals, a business or corporate entity, or any other entity that invests in securities. An issuer can be an entity, or a group of entities acting as one, that issues securities. Likewise, a market intermediary can be an entire or a group of entities acting as one, that market securities on behalf of the issuers. Although only three investors and three issuers, or market intermediaries, and one service provider are illustrated, it is understood that any number of investors, issuers and/or market intermediaries, and service providers may simultaneously reap the advantages and benefits of the present disclosure.

Figure 11:
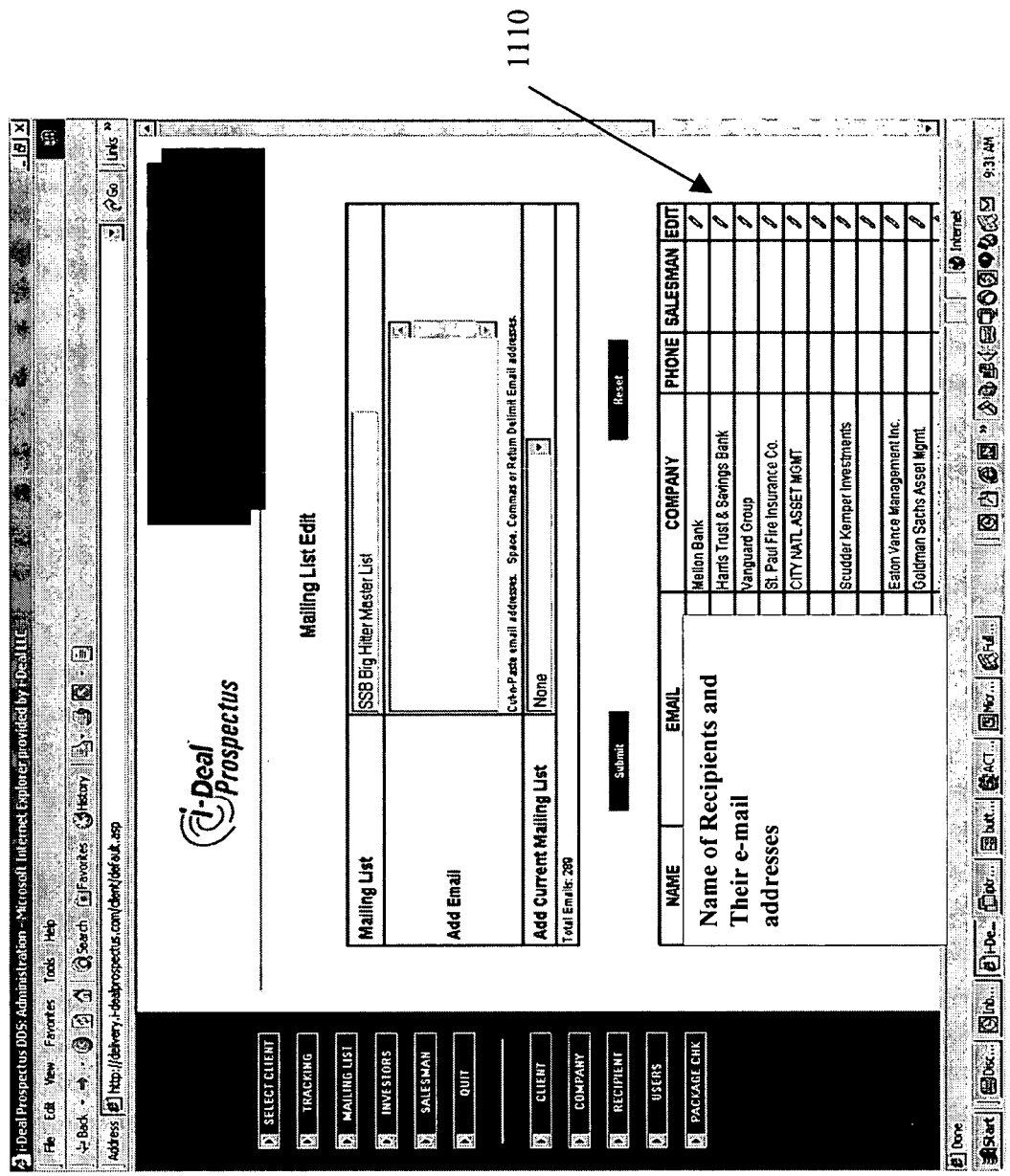
FIG. 11 depicts an investor list available to an issuer in accordance with an embodiment of the present invention.
Figure 12:
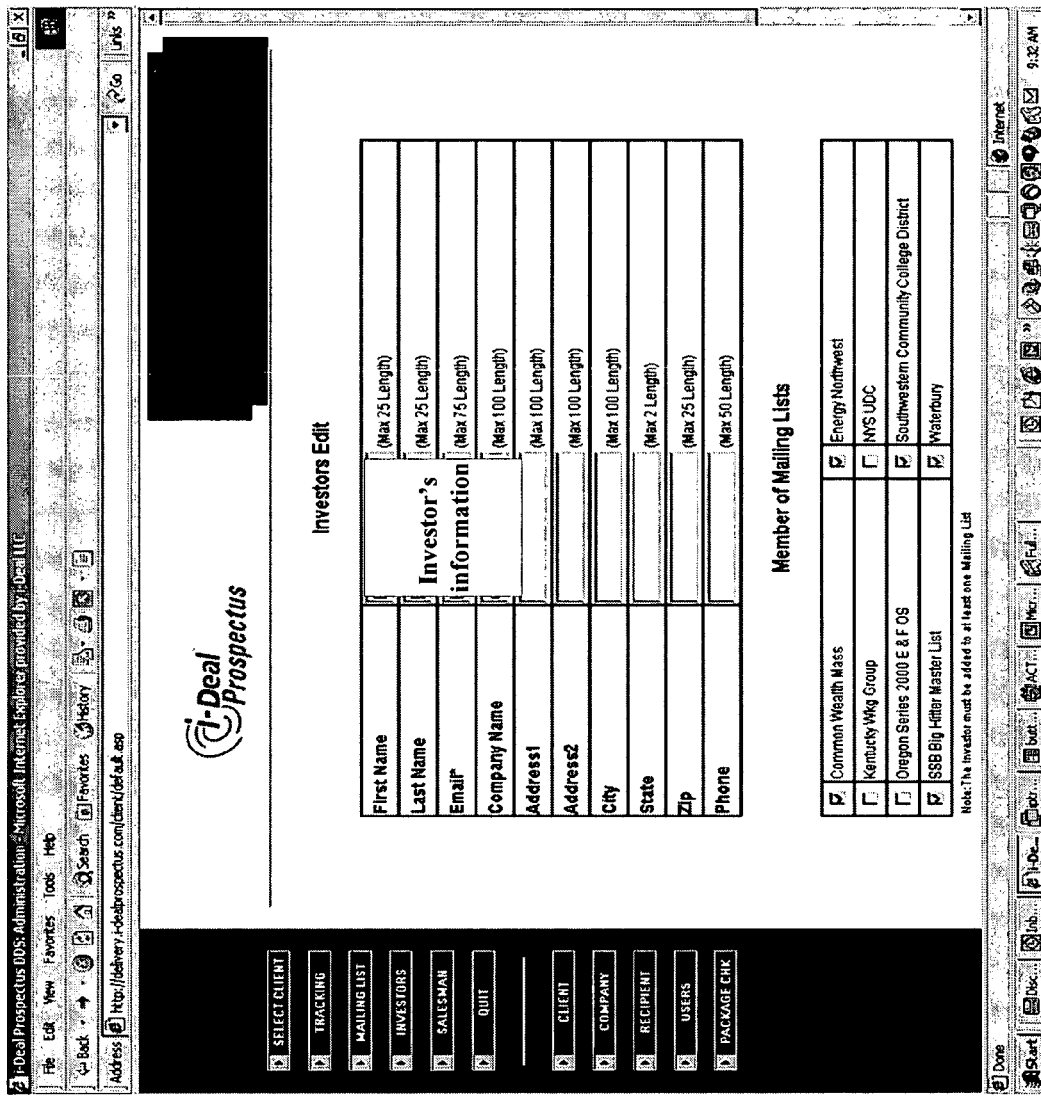
FIG. 12 depicts the editing capability of the investor list shown in FIG. 11 in accordance with another embodiment of the present invention

Each issuer 121-123 can employ the service of the service provider 110 to manage and update its investor list, with individual investor contact information such as e-mail address, for each of the securities that it issues. For instance, an issuer 121 can transmit the investor list and periodic updates of such list to the service provider 110 via the data network 150 in a manner known in the art. Alternatively, the service provider 110 can obtain the investor list and any updates directly from the investors 101-103 on behalf of the issuer 121. The service provider 110 can store the investor list in a database on its computer or server in a manner known in the art for electronic information storage. The service provider 110 can then provide the issuer 121 with the ability to maintain and manage its investor list by providing the list with editing capability through a user interface, such as a web site, an example of which is shown in FIG. 11. The issuer 121 can then edit the list accordingly, e.g., by clicking on the edit link 1110 and be directed to the editing web page shown in FIG. 11. As referred herein, electronic sites, web sites, and web pages are graphical representations of data structures that are electronically provided for viewing; wherein data structure behind each graphical representation may be in a markup language format (e.g., HTML, XML), a computer programming or machine language format, or any other present or future contemplated format that can provide a graphical presentation to the viewers.

When an issuer 121 wishes to electronically deliver particular financial and/or other transaction-related information, such as preliminary offering documents, supplemental offering documents, or final official statements, the service provider 110 can initiate the electronic delivery process as described below.

Figure 2:
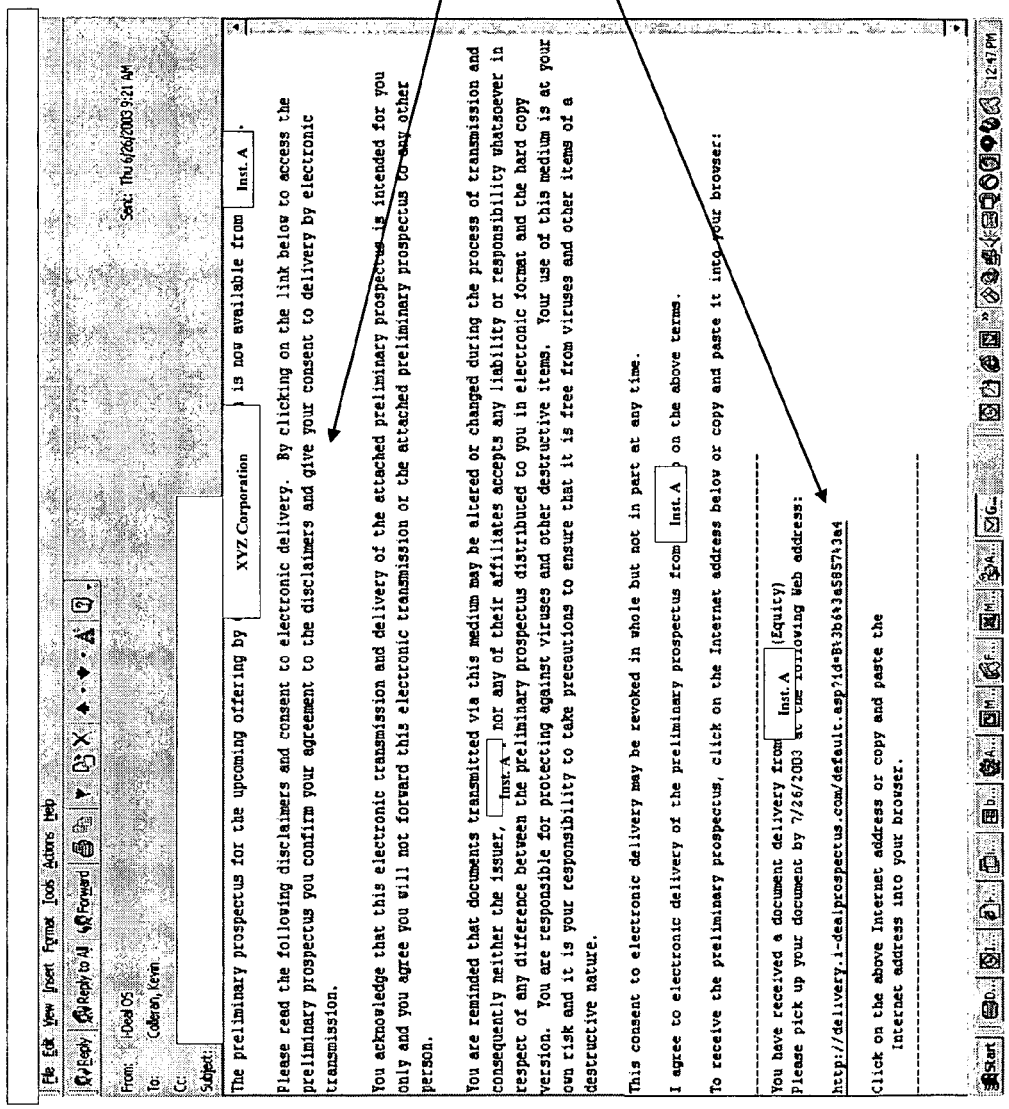
FIG. 2 depicts a sample e-mail notification of the availability of a prospectus to an investor in accordance with an embodiment of the present invention.

First, the service provider 110 receives the information to be delivered, e.g., a prospectus, from an issuer 121 which wishes to send the prospectus to potential investors 101-103. The service provider 110 then prepares the document for electronic delivery and forwards an electronic notification, such as an e-mail notification, directly to each of the investors 101-103, based on investor information obtained from the aforementioned investor list. FIG. 2 provides a sample e-mail notification in accordance with an embodiment of the present invention. To fulfill the notice aspect of electronic delivery requirement, the e-mail notification includes a text message 210, which may include a disclaimer, requesting a deal-specific consent. It also includes an encrypted electronic address link, such as a web address or URL 220, for the investor to click and consent to the electronic delivery of the prospectus. The web address 220 is unique for each receiving investor (i.e., recipient), wherein it provides the service provider 110 with a one-click consent tracking for the issuer 121. In other words, when an investor 101 clicks on the unique web address 220, information is sent from the investor 101 to the service provider 10 through the electronic data network 150, in a manner known in the art for data transmission, to time stamp the access of the web address 220 or consent to the electronic delivery of the prospectus. Such request is tracked and compiled in real time into a delivery summary or audit tracking report for consent record keeping purposes at the server of the service provider 110.

Figure 3:
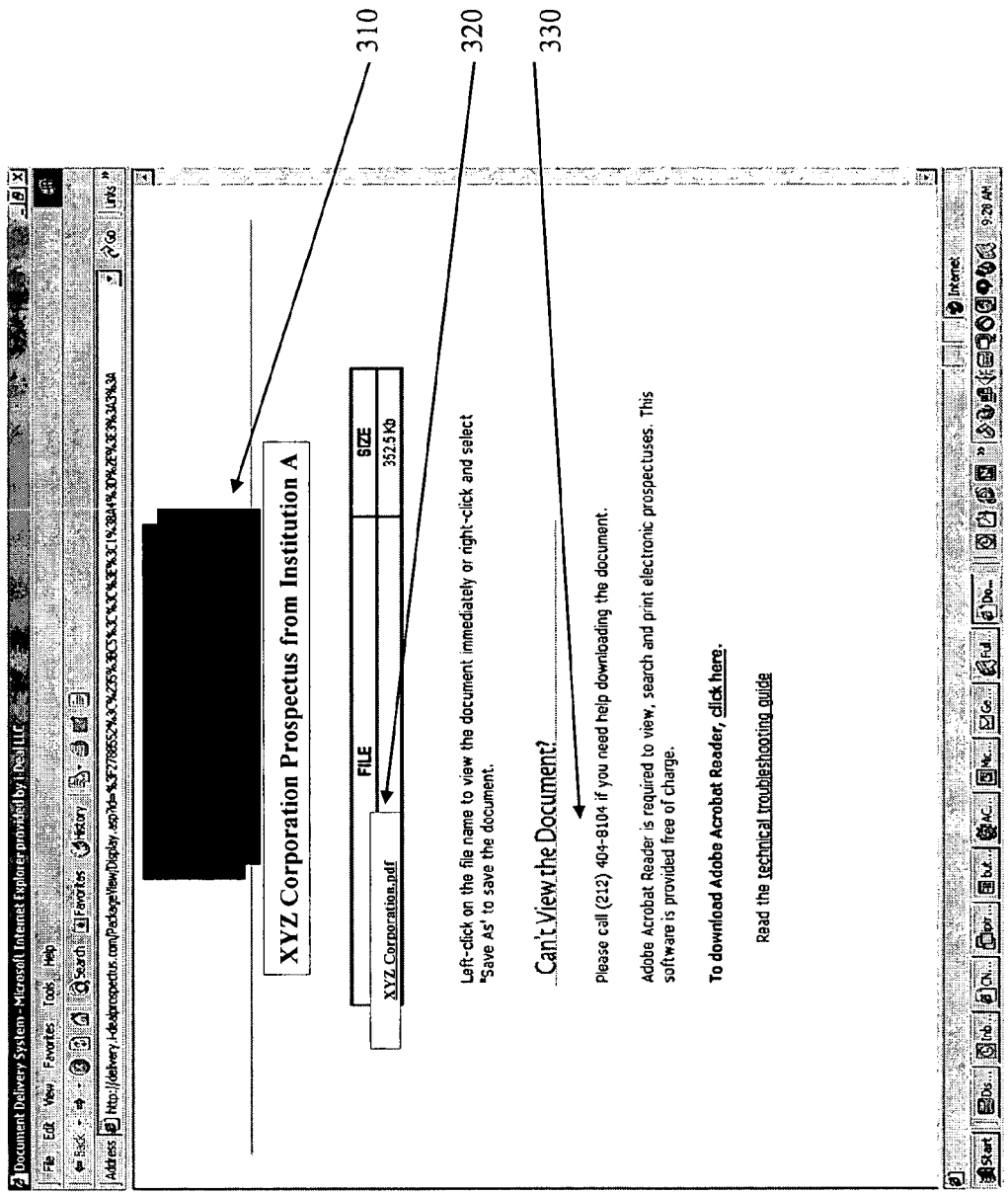
FIG. 3 depicts a private label download page that appears after an electronic consent is received in accordance with an embodiment of the present invention.

Once an investor 101 clicks on the web address 220, the investor is directed to a first secure electronic site maintained by the service provider 110 in its server. The first secure web site can be a private-label download page as shown in FIG. 3 that provides the issuer 121 with additional exposure to the investor community. For instance, the issuer's or the marketing intermediary's logo 310 can be included on the page and linked to the issuer's web site. The private-label download page can further include the service provider's customer service information at 330. The investor 101 can then view or download the delivered offering document by clicking on the link 320. Such document can optionally be password protected, as shown in FIG. 4, wherein the investor 101 can be prompted to enter a pre-designated password at window 410 in order to view or download the document.

Figure 4:
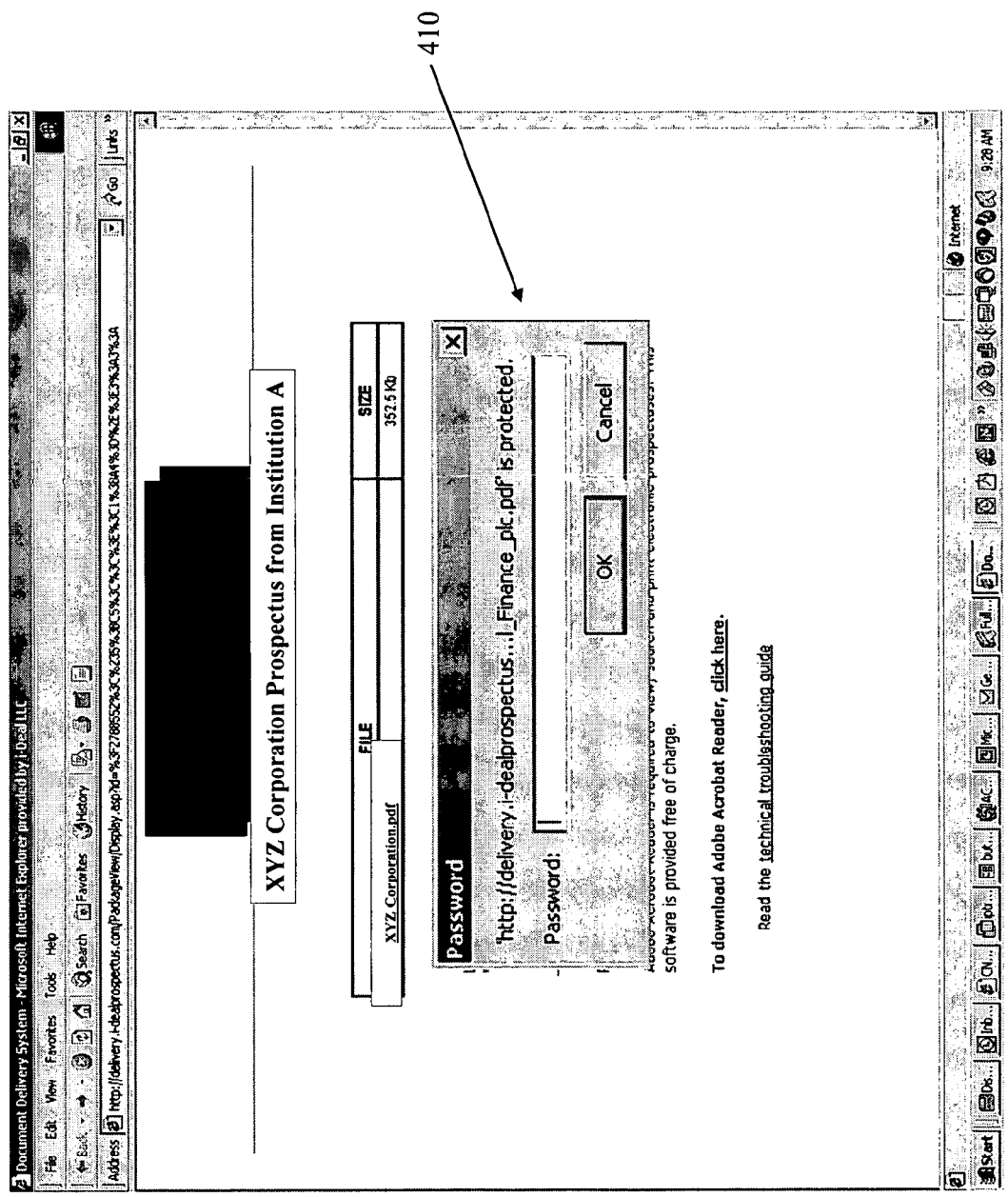
FIG. 4 depicts an optional password window for accessing an electronic document in accordance with an embodiment of the present invention.
Figure 5:
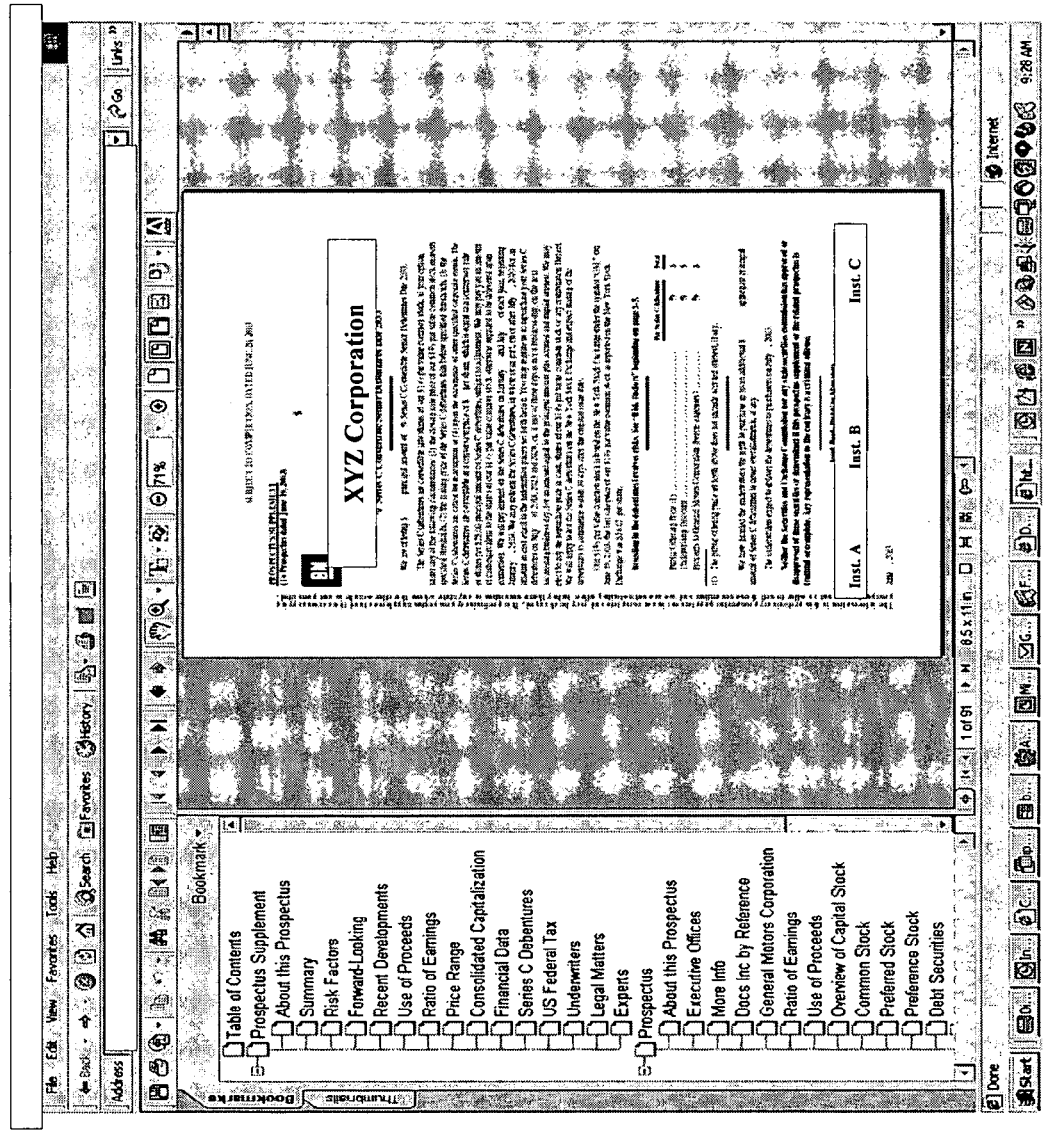
FIG. 5 depicts an electronic version of an offering document that can be delivered to a recipient in accordance with an embodiment of the present invention.

Once the investor 101 clicks on the link 320 in FIG. 3, or enters the correct password in window 410 of FIG. 4, the investor is directed to a web address or URL, also securely maintained by the service provider 110 at its server, that posts an electronic version of the offering document. FIG. 5 shows an example of the electronic offering document. To fulfill the access aspect of the electronic delivery requirement, the electronic version essentially replicates the paper version of the offering document. In this instance, the electronic version is in a secure native PDF format with searchable text and printable but unalterable with copy and paste restrictions throughout the document.

Figure 6:
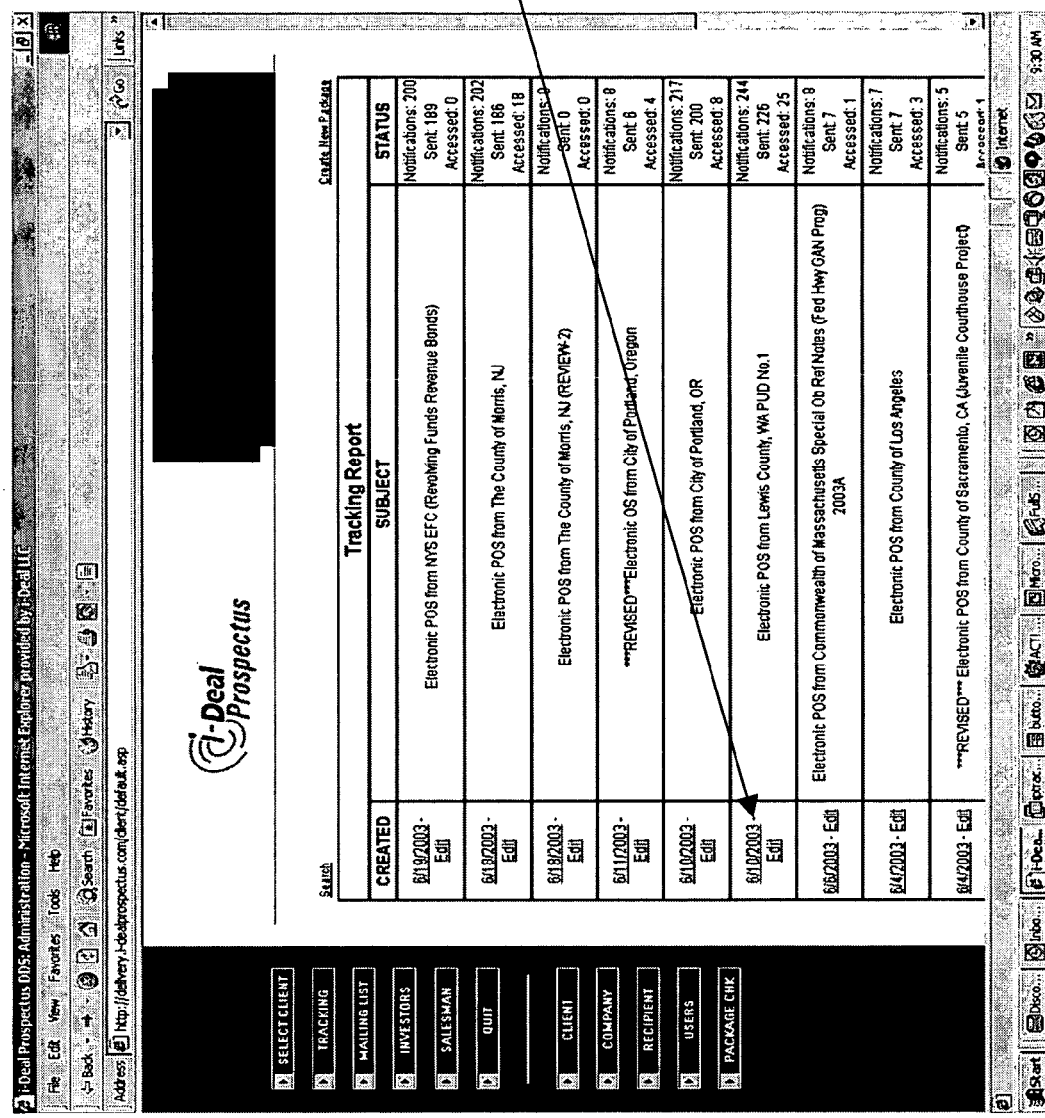
FIG. 6 depicts a private-label maintenance site for deal tracking in accordance with an embodiment of the present invention.
Figure 7:
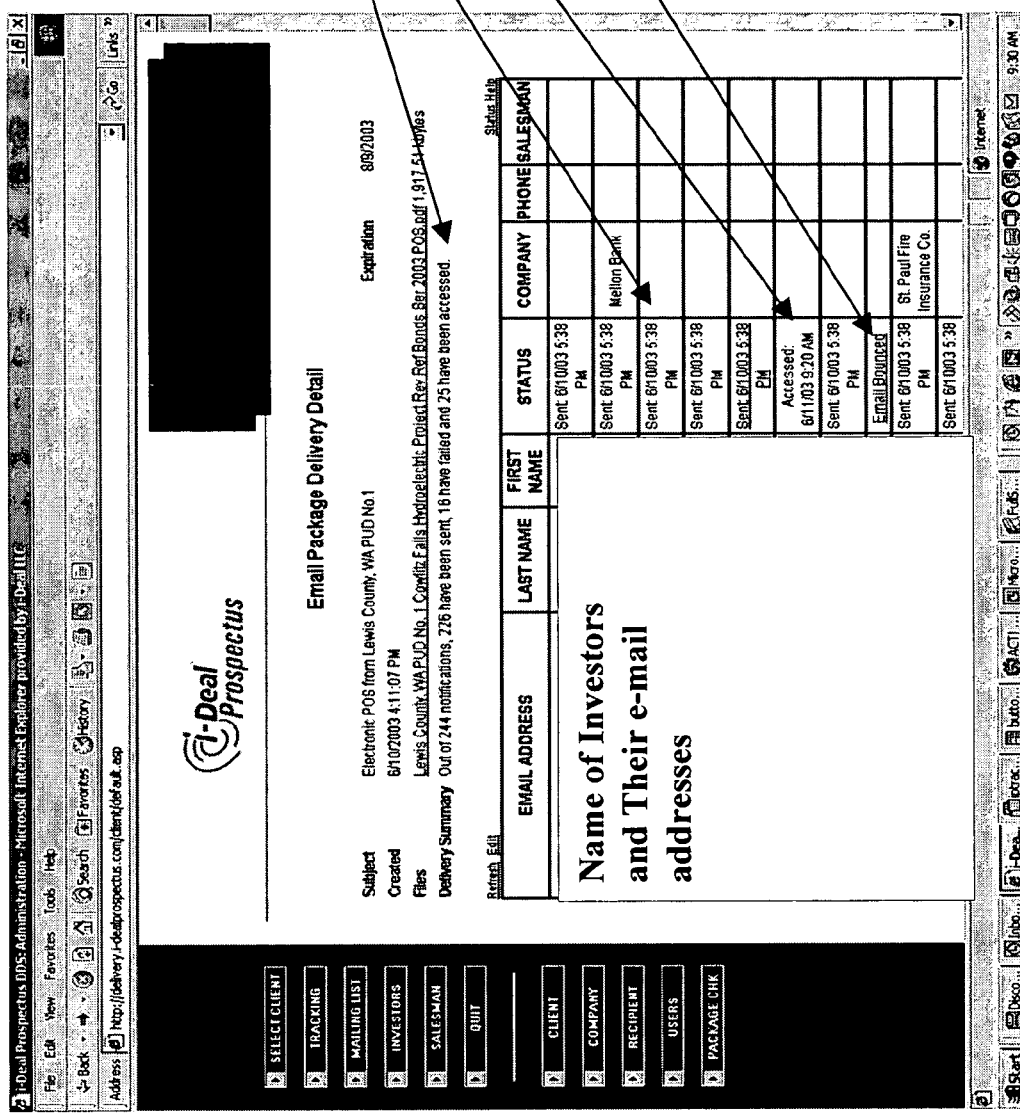
FIG. 7 depicts a real-time audit report available to issuers in accordance with an embodiment of the present invention.

While the investor 101 is provided with an electronic site showing an electronic version of the offering document, the issuer 121 is provided with a separate private-label electronic maintenance site for tracking the viewing of its offering documents by investors. The site can be password protected for the issuer 121 to ensure the confidentiality of the issuer's or the market intermediary's business deals. FIG. 6 shows an example of a private-label maintenance site, specific for the issuer 121, listing all documents being offered by the issuer 121. Each listed document includes a link, such as the created date 610, on which the issuer 121 can click and be directed to another electronic site showing a delivery summary that allows the issuer 121 to track the progress of the distribution of the offering document, i.e., which recipient has clicked on its given unique web address 220 (FIG. 2) and been notified. To fulfill the evidence-of-delivery aspect of the electronic delivery requirement, the delivery summary can be a detailed real-time audit report showing each recipient's identification information (e.g., the name, company, and phone number of the recipient) and status of each recipient on the investor list for a particular one of the documents shown in FIG. 6. FIG. 7 shows an example of the real-time audit report that provides a summary of delivery 710, messages 720 proving delivery was successful, indications 730 showing that the particular recipient has consented by clicking on a correspondingly unique web address 220 and accessing the document; and messages 740 showing bad e-mail addresses to indicate bad or corrupted delivery of document.

Figure 8:
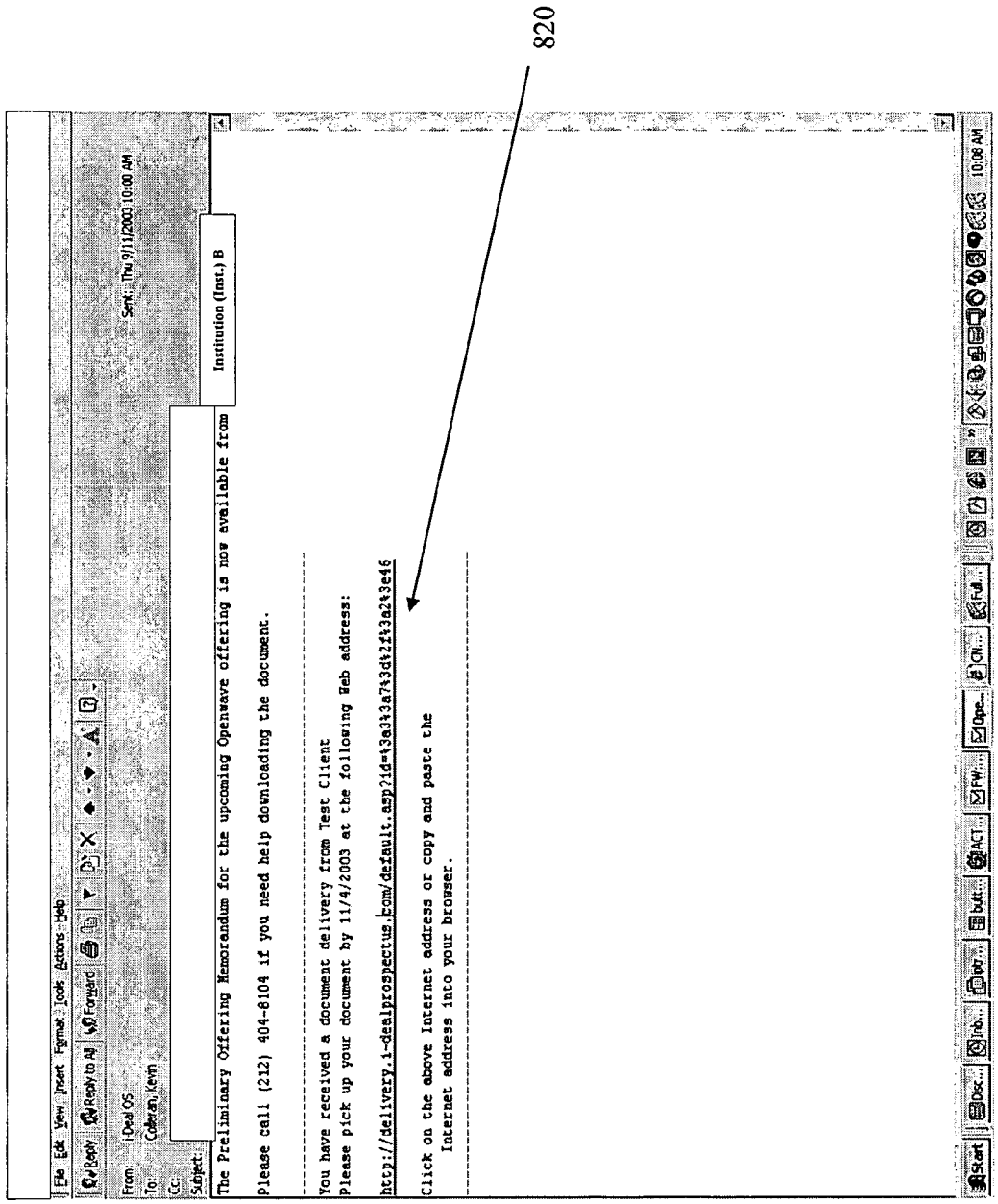
FIG. 8 depicts a sample e-mail notification of the availability of a prospectus to an investor in accordance with another embodiment of the present invention.
Figure 9:
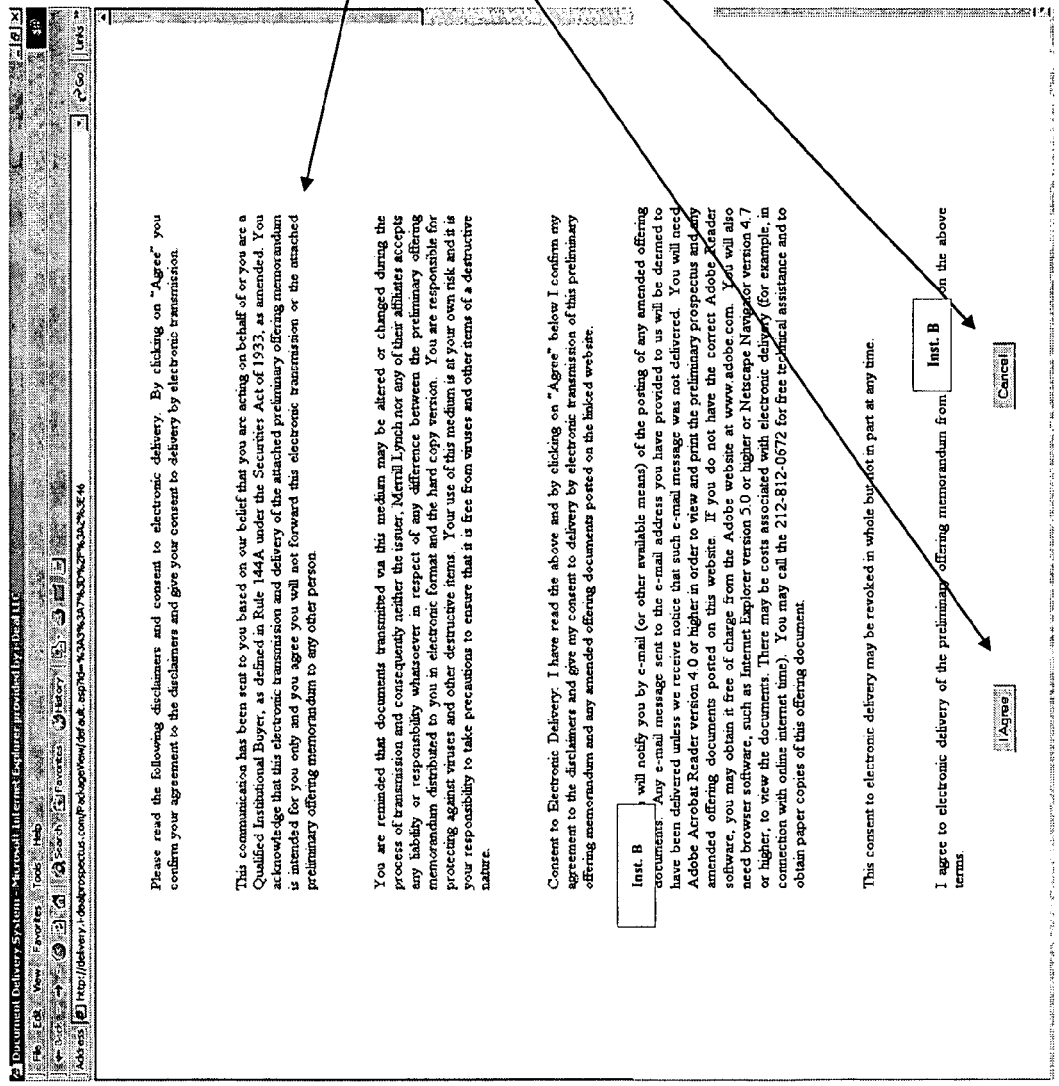
FIG. 9 depicts a consent form for the sample e-mail notification in FIG. 8, in accordance with an embodiment of the present invention.

FIG. 8 shows a sample e-mail notification in accordance with another embodiment of the present invention. In this case, the e-mail notification is a brief e-mail message that is simpler to browse through than the one shown in FIG. 2. The e-mail notification also includes a unique encrypted web address or URL 820 for the investor to access an offering document, such as a prospectus document. However, instead of providing a one-click consent tracking as described earlier, the URL 820 directs the investor 101 to a consent form requesting a deal-specific consent, as shown in FIG. 9. The consent form includes message 910, which may include a disclaimer, and buttons 920 and 930 on which the investor 101 can click to agree or deny the consent. In effect, the URL 820 provides the service provider 110 with a two-click access to the offering document in order to fulfill the notice aspect of electronic delivery requirement. In this embodiment, the separation between the e-mail notification shown in FIG. 8 and the actual consent request shown in FIG. 9 provides the investor 101 and/or its service provider 110 an option to request consent electronically, as in FIG. 9, or otherwise (e.g., telephone consent) after sending out the e-mail notification.

Once the investor 101 clicks on the consent button 920, the investor is directed to a private label download page like that shown in FIG. 3 wherein the investor 101 can view or download the prospectus document as described earlier. Again, the document can optionally be password protected as shown in FIG. 4 and described earlier. To fulfill the access aspect of the electronic delivery requirement, the investor 101 is next shown an electronic version of the prospectus document as shown in FIG. 5 and described earlier. While the investor 101 is provided with a web site showing an electronic version of the prospectus document, the issuer 121 is provided with a private-label maintenance site for tracking the viewing of its offering documents by investors, as shown in FIG. 6 and also described earlier.

Figure 10:
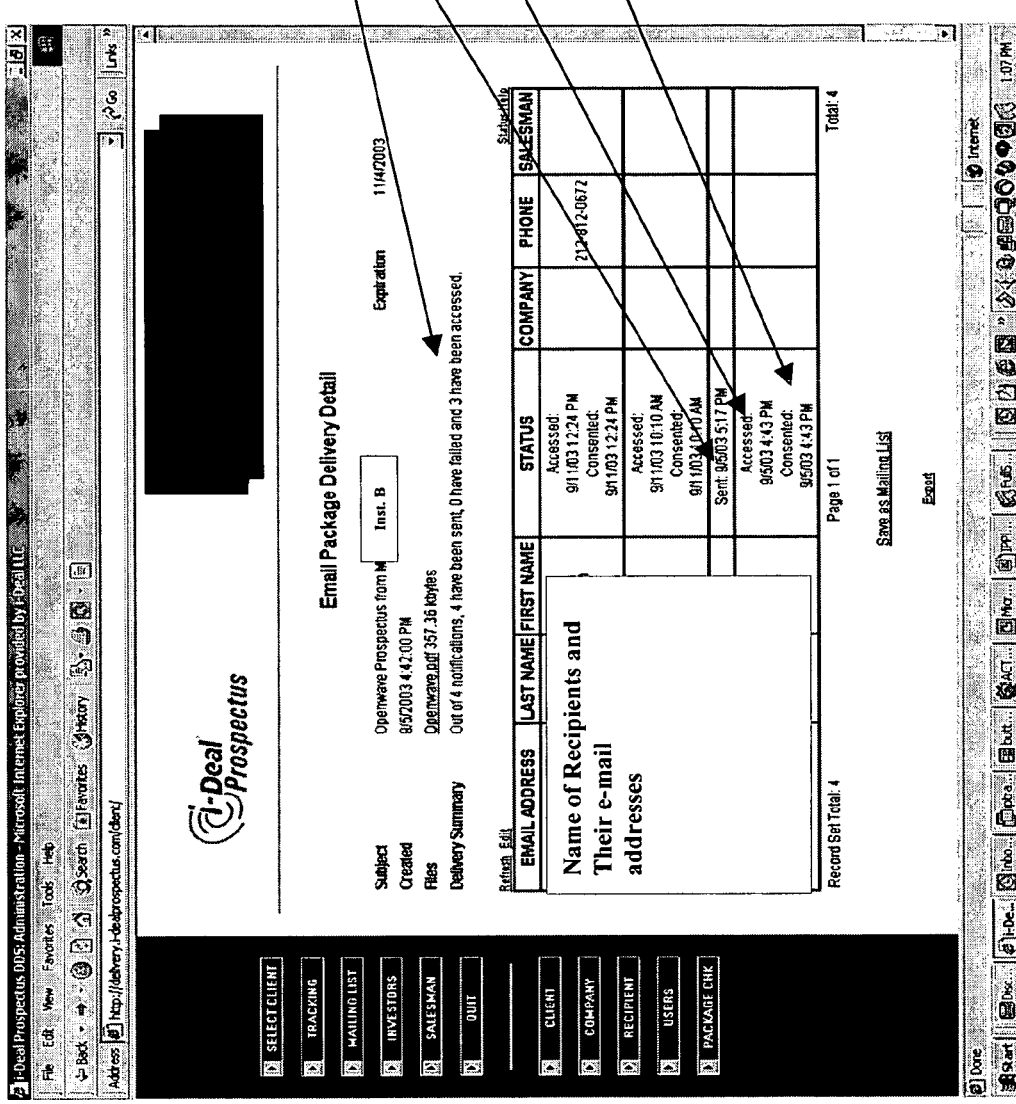
FIG. 10 depicts a real-time audit report available to users in accordance with another embodiment of the present invention.

To fulfill the evidence-of-delivery aspect of the electronic delivery requirement, the issuer 121 can be directed from the private-label maintenance site in FIG. 6 to a delivery summary web site that provides a detailed real-time audit report showing the name, company, phone and status of all recipients on the investor list for a particular document shown in FIG. 6. FIG. 10 shows an example of the real-time audit report similar to the one shown in FIG. 7 and described earlier, except that the real-time audit report in FIG. 10 shows separately the accessing of the consent form 1030 and the actual consent 1040 given at the consent form by an investor/recipient.

Although deal-specific consent for the electronic delivery of a particular financial or other transaction-related document has been described thus far, it should be understood from the present disclosure that the aforementioned embodiments are also applicable for global consent to electronic delivery of multiple documents from any one or more issuers. For instance, the text message in the e-mail notification of FIG. 2 or the consent form of FIG. 9 can include language directing to global consent of the electronic delivery of multiple offering documents rather than a particular offering document. The issuer 121 is also provided with a real-time audit report similar to those shown in FIG. 7 or 10, depending on whether one-click or two-click access is used as described earlier, except that the report is directed to the tracking of consent of each individual investor to electronic delivery of multiple documents from any number of issuers. In all cases, deal-specific or global consent and one-click or two-click access, the real-time audit report can be exported by issuer 121 to its local site for future deals.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method for identifying consent to an electronic delivery of information, comprising the steps of:
   receiving the information;
   receiving destination data to electronically deliver the received information;
   based on the destination data, providing an electronic notification of an availability of the received information and an option to access the received information;
   receiving a first exercise of the option to access the received information;
   responsive to the exercise of the option, prompting a consent for an electronic delivery of the received information;
   receiving a second exercise of a granting or denial of the prompted consent;
   responsive to the exercised granting of the requested consent, providing an electronic access to the received information;
   receiving a third exercise of the provided electronic access to the received information; and
   responsive to the exercised electronic access to the received information, providing the received information.

2. The method of claim 1, further comprising:
   providing a first tracking of the second exercise;
   providing a second tracking of the third exercise; and
   providing a real-time audit report of the first tracking and the second tracking.

3. The method of claim 1, wherein the received information is a financial or transaction-related document.

4. The method of claim 3, wherein the financial or transaction-related document is an offering document.

5. The method of claim 4, wherein the step of receiving the information comprises:
   receiving the prospectus from an issuer of the offering document.

6. The method of claim 1, wherein the option to access the received information includes an electronic link to the requested consent for the electronic delivery of the received information.

7. The method of claim 1, wherein the destination data includes identification data of a recipient that is to receive the information.

8. The method of claim 7, wherein the recipient is an investor.

9. The method of claim 3, wherein the step of requesting the consent for the electronic delivery comprises:
   requesting a specific consent for an electronic delivery of the financial or transaction-related document.

10. The method of claim 1, wherein the received information includes a plurality of financial and/or transaction-related documents.

11. The method of claim 10, wherein the step of requesting the consent for the electronic delivery comprises:
   requesting a global consent for one or more electronic deliveries of any of the plurality financial and/or transaction-related documents.

12. The method of claim 10, wherein the plurality of financial and/or transaction-related documents are offered by one or more issuers of the documents.

13. A computer program product stored in a computer readable medium which executed by a computer performs the following method for identifying consent to an electronic delivery of information:
   receiving the information;
   receiving destination data to electronically deliver the received information;
   based on the destination data, providing an electronic notification of an availability of the received information and an option to access the received information;
   receiving a first exercise of the option to access the received information;
   responsive to the exercise of the option, prompting a consent for an electronic delivery of the received information;
   receiving a second exercise of a granting or denial of the prompted consent;
   responsive to the exercised granting of the requested consent, providing an electronic access to the received information;
   receiving a third exercise of the provided electronic access to the received information; and
   responsive to the exercised electronic access to the received information, providing the received information.

14. The computer program product of claim 13, further comprising:
   providing a first tracking of the second exercise;
   providing a second tracking of the third exercise; and
   providing a real-time audit report of the first tracking and the second tracking.

15. The computer program product of claim 13, wherein the received information is a financial or transaction-related document.

16. The computer program product of claim 15, wherein the financial or transaction-related document is an offering document.

17. The computer program product of claim 16, wherein the step of receiving the information comprises:
   receiving the prospectus from an issuer of the offering document.

18. The computer program product of claim 13, wherein the option to access the received information includes an electronic link to the requested consent for the electronic delivery of the received information.

19. The computer program product of claim 13, wherein the destination data includes identification data of a recipient that is to receive the information.

20. The computer program product of claim 19, wherein the recipient is an investor.

21. The computer program product of claim 15, wherein the step of requesting the consent for the electronic delivery comprises:

requesting a specific consent for an electronic delivery of the financial or transaction-related document.

22. The computer program product of claim 13, wherein the received information includes a plurality of financial and/or transaction-related documents.

23. The computer program product of claim 22, wherein the step of requesting the consent for the electronic delivery comprises:

requesting a global consent for one or more electronic deliveries of any of the plurality financial and/or transaction-related documents.

24. The computer program product of claim 22, wherein the plurality of financial and/or transaction-related documents are offered by one or more issuers of the documents.

\* \* \* \* \*